United States Patent [19]

Colligan

[11] Patent Number: 5,769,306
[45] Date of Patent: Jun. 23, 1998

[54] WELD ROOT CLOSURE METHOD FOR FRICTION STIR WELDS

[75] Inventor: Kevin James Colligan, North Bend, Wash.

[73] Assignee: The Boeing Company, Seattle, Wash.

[21] Appl. No.: 655,840

[22] Filed: May 31, 1996

[51] Int. Cl.$^6$ .................................................. B23K 20/12
[52] U.S. Cl. .......................................... 228/112.1; 228/50
[58] Field of Search ................................ 228/112.1, 114, 228/125, 216, 222, 50; 156/73.5, 580

[56] References Cited

U.S. PATENT DOCUMENTS

| | | |
|---|---|---|
| 4,103,138 | 7/1978 | Moriki . |
| 4,144,110 | 3/1979 | Luc ...................................... 228/112.1 |
| 5,460,317 | 10/1995 | Thomas et al. ...................... 228/112.1 |
| 5,624,067 | 4/1997 | Harwig et al. ............................. 228/50 |

FOREIGN PATENT DOCUMENTS

| | | | |
|---|---|---|---|
| 361052 | 1/1973 | U.S.S.R. ................................. 228/50 |
| 2 270 864 | 3/1994 | United Kingdom ................ 228/112.1 |
| WO 93/10935 | 6/1993 | WIPO . |
| WO 95/26254 | 10/1995 | WIPO ................................ 228/112.1 |

OTHER PUBLICATIONS

Abstracts and Exemplary Claims of U.S. Patents, pp. 6–14, for: U.S. Pat. Nos. 5,469,617; 5,460,317; 5,262,123; 4,811,887; 4,605,151; 3,460,235; 5,170,031; 4,959,241.

*Primary Examiner*—Samuel M. Heinrich
*Attorney, Agent, or Firm*—Christensen O'Conner Johnson & Kindness PLLC

[57] ABSTRACT

A method of root closure of friction stir welds in all types of stir weldable materials, especially difficult to weld materials, such as non-extrudable aluminum alloy 2024, 2014, 2090 and 7075. The method includes providing a backing device that has a recess, such as a groove or channel, sized to receive the tip of the pin of the welding tool and to contain the bead of the weld being formed. The workpiece rests on the backing device, with the proposed weld line aligned with the recess. Thus, as the weld is formed, material is extruded into the recess, completing closure of the weld root, and forming a small bead on the rear side of the workpiece. Optionally, this bead may be removed by a machining process. In one embodiment, the backing device is a plate with a channel machined in its surface so that the workpiece may be temporarily affixed to the plate, with weld line aligned with the channel, for welding. In an alternative embodiment, the backing device is a roller, mounted beneath the rotating pin of the friction stir welding tool, with a circumferential groove on its exterior surface, sized to receive the pin tip and contain the weld bead as the weld is being formed.

22 Claims, 3 Drawing Sheets

WELD ROOT CLOSURE METHOD FOR FRICTION STIR WELDS

FIELD OF THE INVENTION

The invention relates to friction stir welding, and in particular to a method of ensuring weld root closure of non-extrudable alloy workpieces.

BACKGROUND OF THE INVENTION

Friction stir welding (FSW) is a relatively new welding process for joining together workpieces of materials such as metals and plastics. A detailed description of the FSW apparatus and process may be found in Patent Publication WO93/10935; U.S. Pat. No. 5,460,317; and patent publication WO95/26254, all of which are hereby fully incorporated by reference. One of the useful apparatus for FSW is shown in FIGS. 1A and B. As shown in FIG. 1A, two workpieces exemplified by plates, 10A', and 10B', are aligned so that edges of the plates to be welded together are held in direct contact on a backing plate 12'. An FSW tool W' has a shoulder 14' at its distal end, and a non-consumable welding pin 16' extending downward centrally from the shoulder. As the rotating tool W' is brought into contact with the interface between plates 10B' and 10A', the pin 16' is forced into contact with the material of both plates, as shown. The rotation of the pin in the material produces a large amount of frictional heating of both the welding tool pin and at the plate interface. This heat tends to soften the material of the plates in the vicinity of the rotating pin, causing commingling of material from the two plates to form a weld. The tool is moved longitudinally along the interface between plates 10A' and 10B', thereby forming an elongate weld all along the interface between the plates. The welding tool's shoulder 14' prevents softened material from the plates from escaping upwards and forces the material into the weld joint. When the weld is completed, the welding tool is retracted.

During the stir welding process, the tip of the pin 16' does not completely penetrate through to the rear side of the workpiece. Thus, a small amount of workpiece material passes under the pin, and is not stirred by it. Closure of this region of the weld, known as the "root" of the weld, depends upon heating and plastic deformation as the pin passes above it. For those aluminum alloys that are easily welded, closure of the root is readily accomplished. However, for those materials that are difficult to weld, such as non-extrudable aluminum alloys, the pin must pass very close to the rear surface of the workpiece in order to achieve root closure.

With the difficult to weld alloys, even a small variation in the space between the tip of the pin and the rear side of the workpiece can result in incomplete root closure. This defect in the weld is especially serious since it can be virtually impossible to detect by non-destructive inspection techniques. There exists a need to improve the process of friction stir welding to eliminate this incomplete closure of the weld root, and ensure complete welding of difficult to weld alloys.

SUMMARY OF THE INVENTION

The invention provides methods of closing the weld root during friction stir welding, especially of "difficult to friction weld materials," such as non-extrudable aluminum alloys, thereby providing a weld throughout a workpiece of this material. However, the invention may also be used advantageously with other materials, such as extrudable aluminum alloys.

In accordance with the invention, a workpiece, is positioned on a backing device with a proposed weld line aligned with a recess in the backing device supporting the workpiece beneath the friction stir welding tool pin. The recess, preferably semi-circular in cross section, is sized to receive the tip of the pin and the bead of the proposed weld. The workpiece is welded using the rotating pin, with the tip of the pin penetrating the material of the workpiece so that it is at least even with a rear surface of the workpiece, proximate the recess in the backing device. Generally, this causes a small bead to form along the rear surface of the workpiece, along the root of the weld. Machining of the bead produces a smooth weld surface on the rear surface of the workpiece.

In one embodiment of the invention, the backing device is a backing plate onto which the workpiece is conventionally affixed for the welding process. However, in accordance with the invention, the proposed weld line is aligned with a shallow groove in the backing plate. Typically, the groove is about 0.01 to about 0.02 inches deep, and about 0.1 to about 0.2 inches wide. Moreover, it is preferred that the groove have a semi-circular or semi-elliptical cross section, such as that produced by machining with a ball-nosed end mill. Preferably, the radius of the groove is the same as the radius of the tip of the pin of the welding tool. During welding, the tip of the pin is approximately aligned with the rear surface of the workpiece being welded. This usually causes a small amount of material to extrude into the groove under the pin, leaving a weld bead protruding along the root of the weld and contained in the groove. It is usually necessary to plunge the welding tool an additional small distance, about 0.003 inches, over that required of the prior art, in order to compensate for the small amount of material extruded into the groove.

In an alternative embodiment, the workpiece being welded is drawn continuously into the friction stir welding apparatus by a rotating roller mounted beneath the rotating pin and shoulder of the welding tool. In accordance with the invention, the roller has a continuous circumferential groove, preferably of width and depth as described above, located beneath the tip of the pin so that the tip of the pin is at least able to penetrate up to the rear surface of the workpiece. During friction stir welding, some material of the workpiece may extrude into the groove to form a bead along the root of the weld on the rear side of the workpiece. This method also ensures closure of the weld root.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The method of the invention provides closure of a weld root, of stir weldable materials, especially of "difficult to friction stir weld materials," such as the non-extrudable aluminum alloys, during friction stir welding. It is believed that when welding this type of material, the portion of the material directly beneath the rotating pin remains relatively undisturbed so that the usual commingling to form a weld does not take place. This effect may also arise in other stir weldable materials, although less commonly. As a result, the weld root does not readily close completely. In order to produce the desired closed weld root, the method of the invention allows deeper penetration of the pin of the welding tool into the workpiece, to the very rear of the workpiece. In so doing, softened material produced by the rotating pin of the friction weld tool may extrude to a limited extent on the rear side of the weld, to produce a weld bead. As a consequence, the weld extends from the upper surface of the workpiece, where it is formed by the shoulder of the rotating tool, to protrude slightly beyond the rear side of the workpiece. The rear side of the workpiece is then optionally machined to produce a smooth weld surface, if required.

In the specification and claims, the terms "difficult to (friction stir) weld materials" and "difficult to (friction stir) weld alloys" refer to those compositions that are subject to friction stir welding, but that do not in prior art techniques easily achieve complete weld root closure. These compositions are exemplified by the non-extrudable aluminum alloys, a few non-limiting examples of which include aluminum alloys 2024, 7075, 2014, and 2090.

In order to practice the method of the invention, the backing device used to support the workpiece in the friction stir welding apparatus is machined to provide a recess, sized to accommodate the tip of the pin of the welding tool and contain the bead of the weld as it is formed. In the event that the workpiece is planar and fixedly attached to the backing device, then the device is preferably a grooved plate and the proposed weld line is aligned with the groove. Alternatively, if the backing device is movable relative to the workpiece, then a recess is created in the backing device, beneath the rotating pin of the stir welding tool, so that a continuous weld bead is formed in the recess, as the workpiece material is welded by the rotating pin. In this instance, the backing device is preferably a rotatable horizontal, circumferentially grooved roller located beneath the rotating tool tip, with the groove of the roller aligned with the tool tip to receive the weld bead as welding proceeds.

Figure 1A:
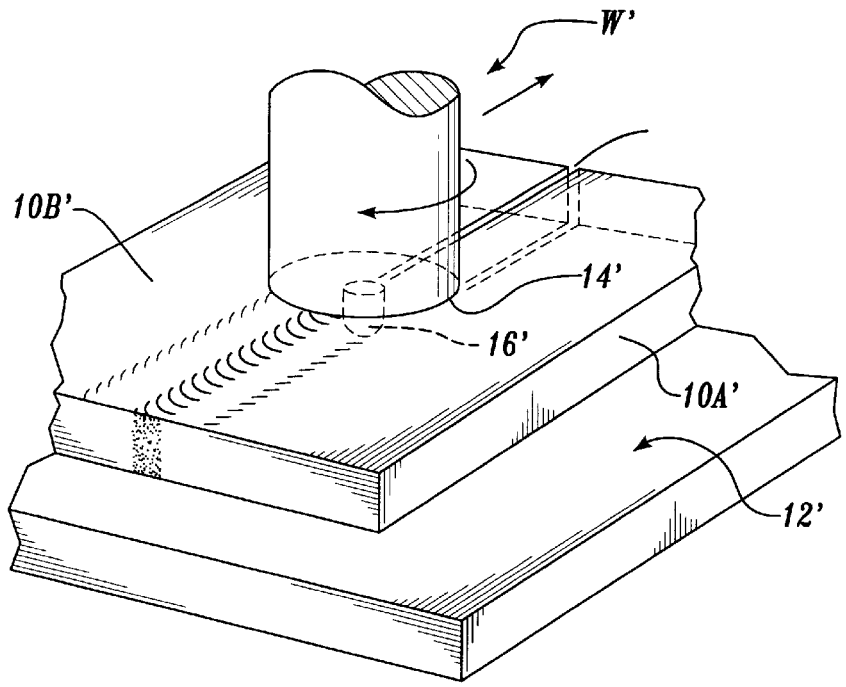
FIG. 1A is a schematic diagram illustrating a prior art friction stir welding process.
Figure 1B:
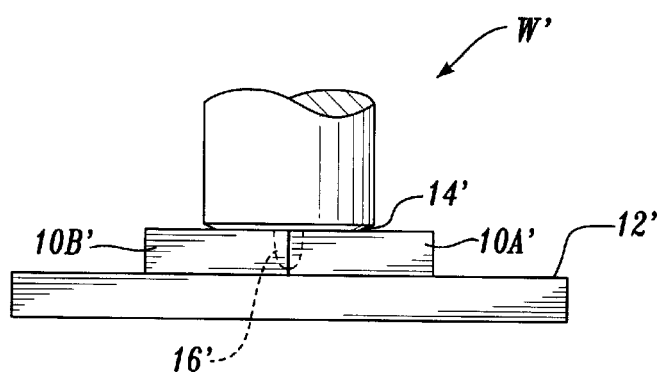
FIG. 1B is an end view of FIG. 1A illustrating the insertion of the tip of the friction stir welding tool into the workpiece to produce a weld.
Figure 2:
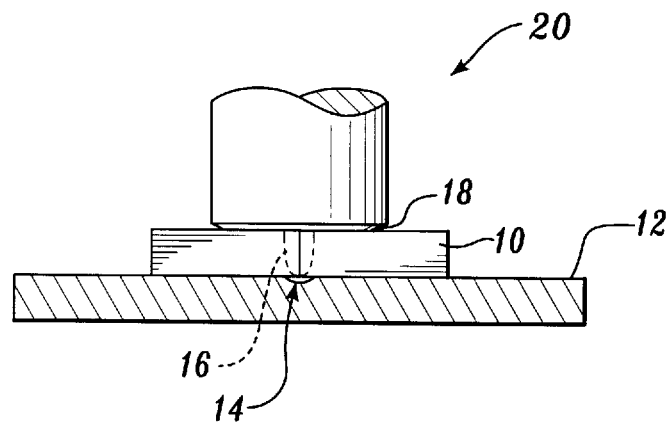
FIG. 2 is a schematic illustration of an end view of a friction stir welding tool, showing an embodiment of the grooved backing plate of the invention.
Figure 3:
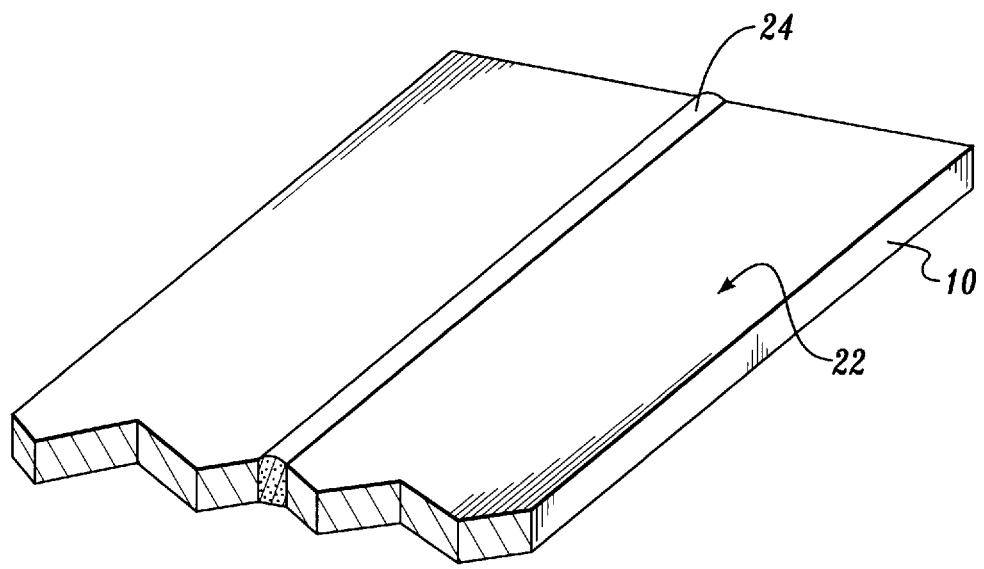
FIG. 3 is an illustrative example of a workpiece showing a bead of a weld extending along the rear side of the workpiece, in accordance with the invention.

As illustrated schematically in FIG. 2, the exemplified planar workpiece 10 is affixed to the planar backing plate 12 for support. The backing plate is machined to provide a channel 14, preferably semi-circular or semi-elliptical in cross section, that is sized to receive the bead of the proposed weld, and shaped to conform to the proposed weld line. Typically the channel is sized to receive the tip of the pin 16 of the welding tool 20. Thus, the channel 14 is preferably about 0.1 to about 0.2 inches wide, and about 0.01 to about 0.02 inches deep. The size of the channel is exaggerated in the figures for illustrative purposes. During welding, the tip of the rotating pin 16 of the friction stir weld tool 20 extends through the workpiece material until the tip extends to the rear side of the material and at least approaches the mouth of the channel 14. Preferably, the tip of the pin 16 is aligned with the rear side 22 of the workpiece 10, i.e., with the edges of the backing plate 12 on either side of the channel. Due to pressure on softened material provided by the shoulder 18 and pin 16 of the rotating welding tool 20, material is forced downward and a portion thereof extrudes into the channel 14 to form a bead 24 of semi-elliptical cross section, as shown in FIG. 3. Thereafter, the welded workpiece is optionally machined to remove the weld bead 24 and produce a substantially smooth weld surface.

Figure 4A:
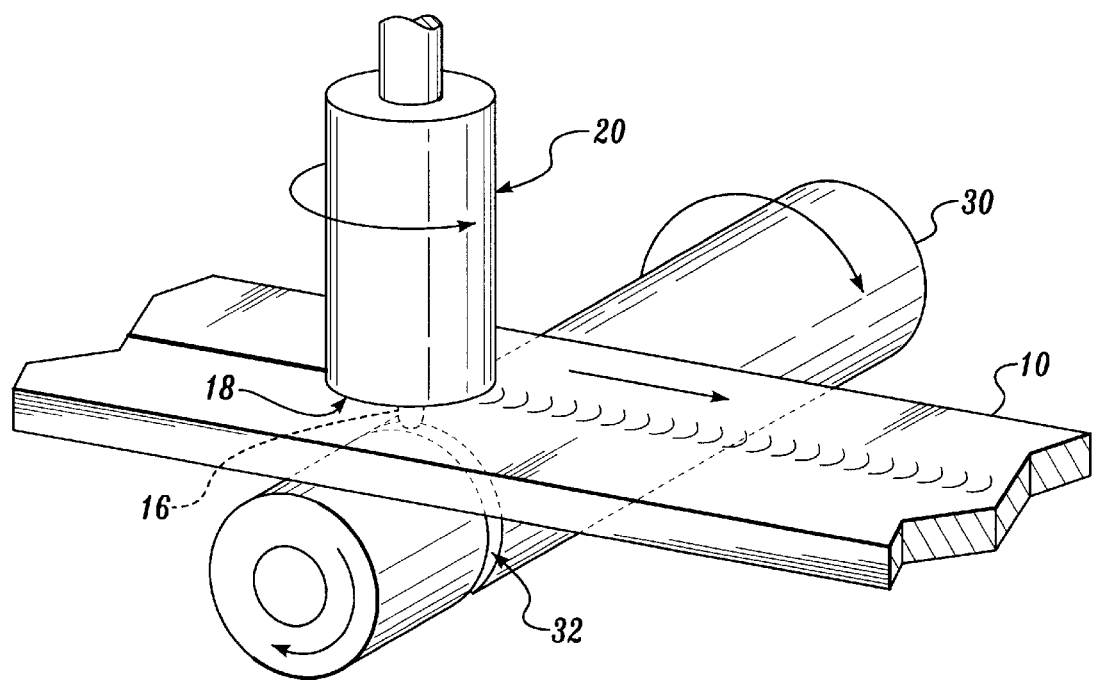
FIG. 4A is a schematic perspective diagram showing the formation of a closed root weld using a grooved roller as a backing device, in accordance with the invention.
Figure 4B:
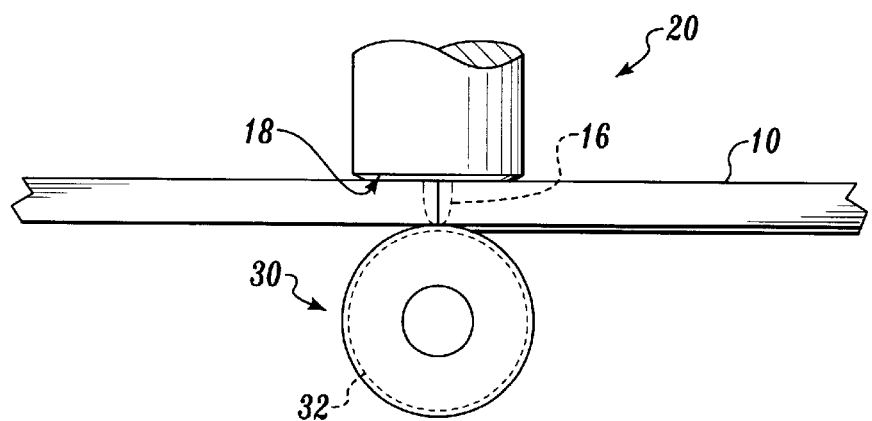
FIG. 4B is an end view of FIG. 4A.

In the alternative embodiment shown schematically in FIGS. 4A and 4B, the material to be welded is not affixed to a supporting backing plate. In this instance, a horizontal rotatable cylinder or roller 30 is located beneath the pin 16 of the welding tool 20. The roller 30 has a groove 32, sized, as described above, to receive the tip of the pin 16 and contain the weld bead as it is formed. The groove is preferably semi-circular or semi-elliptical in cross section, and extends around the circumference of the roller 30. The size of the groove 32 is exaggerated in the FIGURES for illustrative purposes. For welding, the proposed weld line is aligned with this groove 32. The roller 30 is spaced from the tip of the rotating pin 16 of the welding tool 20 such that the tip is at least flush with the edges of the cylinder 30 at the mouth of the groove 32. Thus, the tip of pin 16 extends to at least the rear side of the workpiece 10, and preferably up to the rear side. Preferably, the roller 30 rotates, under power, in a direction to draw the workpiece past the welding tool 20 at a controlled rate to form the weld.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The embodiments of the invention in which an exclusive property or privilege is claimed are defined as follows:

1. A method of friction stir welding a workpiece, the method comprising:
    (a) positioning the workpiece with a proposed weld line aligned with a recess in a backing device;
    (b) welding the workpiece with a tool comprising a rotating non-consumable pin having a tip, the tip of the pin penetrating material of the workpiece at least up to a rear surface of the workpiece proximate the recess in the backing device to form a weld bead comprising commingled material of the workpiece, the bead extending into the recess; and
    (c) machining the bead of the weld to produce a smooth weld surface on the rear surface of the workpiece.

2. The method of claim 1, wherein the welding with a tool comprises welding with the tip of the pin substantially aligned with the rear surface of the workpiece.

3. The method of claim 1, wherein the step of welding comprises welding a workpiece temporarily affixed to a backing plate having a groove for receiving a bead of the weld.

4. The method of claim 1, wherein the welding comprises welding with the workpiece continuously moving under the tool on a rotating backing device, the rotating backing device comprising a roller with a circumferential groove.

5. The method of claim 1, wherein the recess in the backing device is sized to cooperate with the tip of the rotating pin.

6. A method of friction stir welding, the method comprising:
    (a) aligning a proposed weld line of a workpiece with a recess in a backing device, the recess sized to receive a tip of a pin for forming a weld; and (b) welding with a tool comprising a non-consumable rotating pin having a tip, the tip of the pin penetrating the workpiece at least up to a rear side of the material to produce a weld bead comprising commingled material of the workpiece, the bead extending into the recess.

7. The method of claim 6, wherein the step of welding comprises welding with the tip of the pin aligned with the edges of the backing device on either side of the recess.

8. The method of claim 6, wherein the welding comprises forming a bead of weld, the bead at least partially filling the recess in the backing device.

9. The method of claim 8, further comprising machining the bead of the weld to produce a substantially smooth, weld surface.

10. The method of claim 6, wherein the recess is semi-circular in cross section.

11. The method of claim 6, wherein the backing device is a plate temporarily affixed to the workpiece.

12. The method of claim 6, wherein the aligning with a recess in a backing device comprises aligning on a rotatable roller, the roller having a circumferential channel in its outer surface.

13. The method of claim 12, wherein the aligning includes aligning on a driven roller, the roller drawing the workpiece to and past the rotating pin.

14. A method of friction stir welding a workpiece to produce weld root closure, the method comprising:

friction stir welding a workpiece, comprising a difficult to friction stir weld material, with a rotating tool, the tool comprising a rotating non-consumable pin and a shoulder proximal to the pin, the pin penetrating a workpiece being welded such that a tip of the pin extends into the workpiece to a depth sufficient to form an outward projecting weld bead comprising commingled material of the workpiece, the bead extending along a rear surface of the weld.

15. The method of claim 14 wherein the welding includes containing the formed weld bead in a channel in a backing plate.

16. The method of claim 15, wherein the welding includes containing the weld bead in a channel having a semi-circular cross section.

17. The method of claim 14, wherein the welding includes containing the formed weld bead in a circumferential groove of a rotating roller mounted beneath the rotating pin of the rotating tool.

18. The method of claim 14, wherein the welding includes drawing the workpiece to and past the rotating pin and shoulder of the rotating tool by supporting the workpiece on a driven roller, the roller having a circumferential groove in its outer surface sized to accommodate the tip of the rotating pin.

19. The method of claim 1, wherein the positioning comprises positioning a workpiece comprised of a non-extrudable aluminum alloy.

20. The method of claim 6, wherein the aligning is aligning a workpiece comprised of a non-extrudable aluminum alloy.

21. A method of friction stir welding a workpiece to produce weld root closure, the method comprising:

friction stir welding a workpiece with a rotating tool, while drawing the workpiece to and past a rotating pin and shoulder of the rotating tool by supporting the workpiece on a driven roller, the roller having a circumferential groove in its outer surface sized to accommodate the tip of the rotating pin, said pin penetrating the workpiece being welded such that said tip of said pin extends into the workpiece to a depth sufficient to form an outward projecting weld bead along a rear surface of the workpiece.

22. The method of claim 21 wherein the workpiece comprises a difficult to friction stir weld material.

* * * * *